US006931911B1

(12) United States Patent
Delmoro et al.

(10) Patent No.: US 6,931,911 B1
(45) Date of Patent: Aug. 23, 2005

(54) DYNAMIC CALIBRATOR

(75) Inventors: Richard L. Delmoro, Tallmadge, OH (US); David P. Krause, Hartville, OH (US)

(73) Assignee: Akron Special Machinery, Inc., Akron, OH (US)

( * ) Notice: Subject to any disclaimer, the term of this patent is extended or adjusted under 35 U.S.C. 154(b) by 259 days.

(21) Appl. No.: 10/364,042

(22) Filed: Feb. 12, 2003

(51) Int. Cl.[7] ................................. G01M 1/14
(52) U.S. Cl. ...................................... 73/1.14
(58) Field of Search .............. 73/1.01, 1.08, 73/1.09, 1.11, 1.14, 1.15, 146

(56) References Cited

U.S. PATENT DOCUMENTS 3,698,233 A * 10/1972 Braden et al. ............. 73/146
5,542,294 A * 8/1996 Douglas ..................... 73/462
6,305,211 B1 * 10/2001 Thelen et al. .............. 73/1.14
6,513,372 B2 * 2/2003 Anno et al. ................ 73/146

* cited by examiner

Primary Examiner—Robert Raevis
(74) Attorney, Agent, or Firm—Renner, Kenner, Greive, Bobak, Taylor and Weber

(57) ABSTRACT

A dynamic calibrator in an tire uniformity machine for testing a tire having a chuck assembly for receiving and chucking a tire load cell in sensing relation therewith, the load cell transmitting sensed information to a controller, the dynamic calibrator including a rotatable calibration wheel coupled to the chuck assembly; a motor assembly operatively coupled to the wheel to cause rotation thereof; and a wheel velocity sensing assembly.

10 Claims, 4 Drawing Sheets

DYNAMIC CALIBRATOR

RELATED PATENT APPLICATIONS

None.

BACKGROUND OF THE INVENTION

Tire uniformity machines are commonly used to test tires by rotating them at various speeds and measuring the characteristics of the tires and ensure that they are constructed within quality standards. To do this, the tire uniformity machine receives a tire, chucks the tire on a rotating spindle, and, after pressurizing the tire and causing it to rotate, brings a loadwheel into contact with the tire to simulate a road surface and measure the forces generated by the tire. Measurements are also taken at the spindle, and, to that end, the spindle is provided with one or more load cells. It will be appreciated that these load cells are very sensitive and can be affected during shipping or other handling such that the load cell does not generate accurate readings. To ensure that the load cell reads accurately, it is desirable to calibrate the load cell after shipping or other handling. Presently, it is necessary to disassemble the spindle and manually inspect the load cell to ensure that it is in condition to take proper measurements.

It will be appreciated that most users are reluctant to perform this task each time the tire uniformity machine is moved. Due to this reluctance, the load cell in the machine may generate inaccurate readings that can skew other measurements made by the tire uniformity machine. As a result, the machine may not provide accurate repeatable output.

SUMMARY OF THE INVENTION

It is, therefore, one aspect of the present invention to provide a means of obtaining repeatable output from the tire uniformity machine.

It is another aspect of the present invention to provide a more convenient means of calibrating a spindle load cell in a tire uniformity machine.

In general, the present invention provides a dynamic calibrator in a tire uniformity machine for testing a tire having a chuck assembly for receiving and chucking a tire and a load cell in sensing relation therewith, the load cell transmitting sensed information to a controller, the dynamic calibrator including a rotatable calibration wheel coupled to the chuck assembly, a motor assembly operatively coupled to the wheel to cause rotation thereof, and a wheel velocity sensing assembly.

The present invention further provides a dynamic calibrator in a tire uniformity machine for testing a tire having a chuck assembly for receiving and chucking a tire, a load cell in sensing relation with the chuck assembly, the load cell transmitting sensed information to a controller, the dynamic calibrator including a framework attachable to the chuck assembly, a wheel rotatably supported by the framework, a weight releasably attached to a point on the wheel, a motor assembly operative with the wheel to cause rotation thereof, and a velocity sensor measuring a velocity of the calibration wheel, the velocity sensor being in communication with the controller, whereby the wheel is rotated by the motor assembly at a velocity with the weight attached to generate a force measured by the load cell.

The present invention further provides a method for calibrating the load cell in a tire uniformity machine having a chucking assembly for receiving and chucking a tire to be tested, a motor assembly capable of rotating the chuck assembly and a load wheel assembly, at least one load cell associated with the tire uniformity machine measuring forces generated by the tire during testing, the method including providing a dynamic calibrator that includes a wheel, coupling the dynamic calibrator to the chucking assembly, rotating the wheel at a known velocity, and recording output values from the load cell.

DETAILED DESCRIPTION OF THE INVENTION

Figure 2:
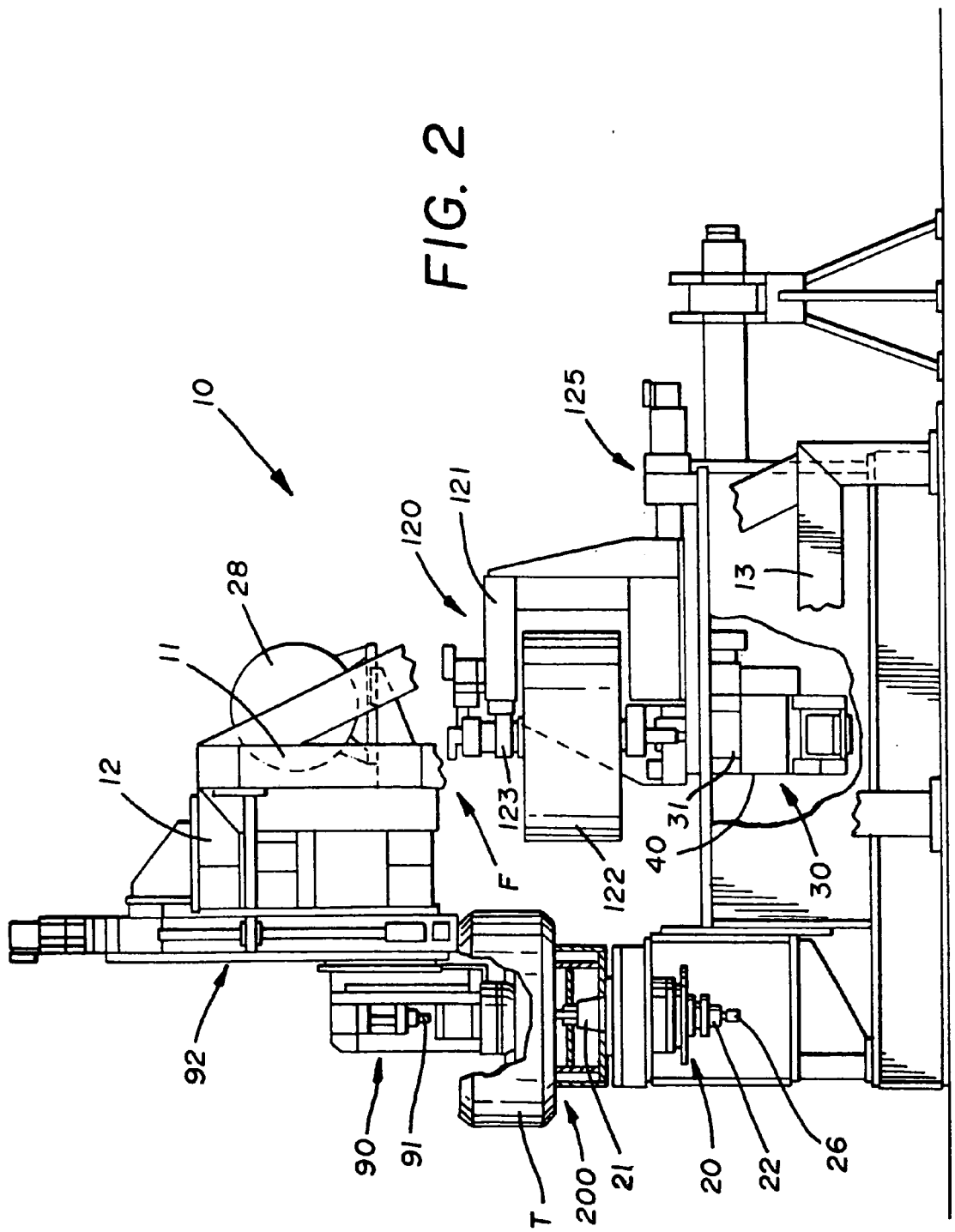
FIG. 2 is a partially sectioned front plan view of a tire uniformity machine with a dynamic calibrator according to the present invention.

A tire uniformity machine, generally indicated by the numeral 10 in the FIGURES, generally includes, as best shown in FIG. 2, vertical side frame members 11, a generally horizontal top frame member 12, and generally horizontal bottom frame members 13 to form a framework F for the machine 10, creating generally a box-like structure within which a tire T is received and tested.

Figure 1:
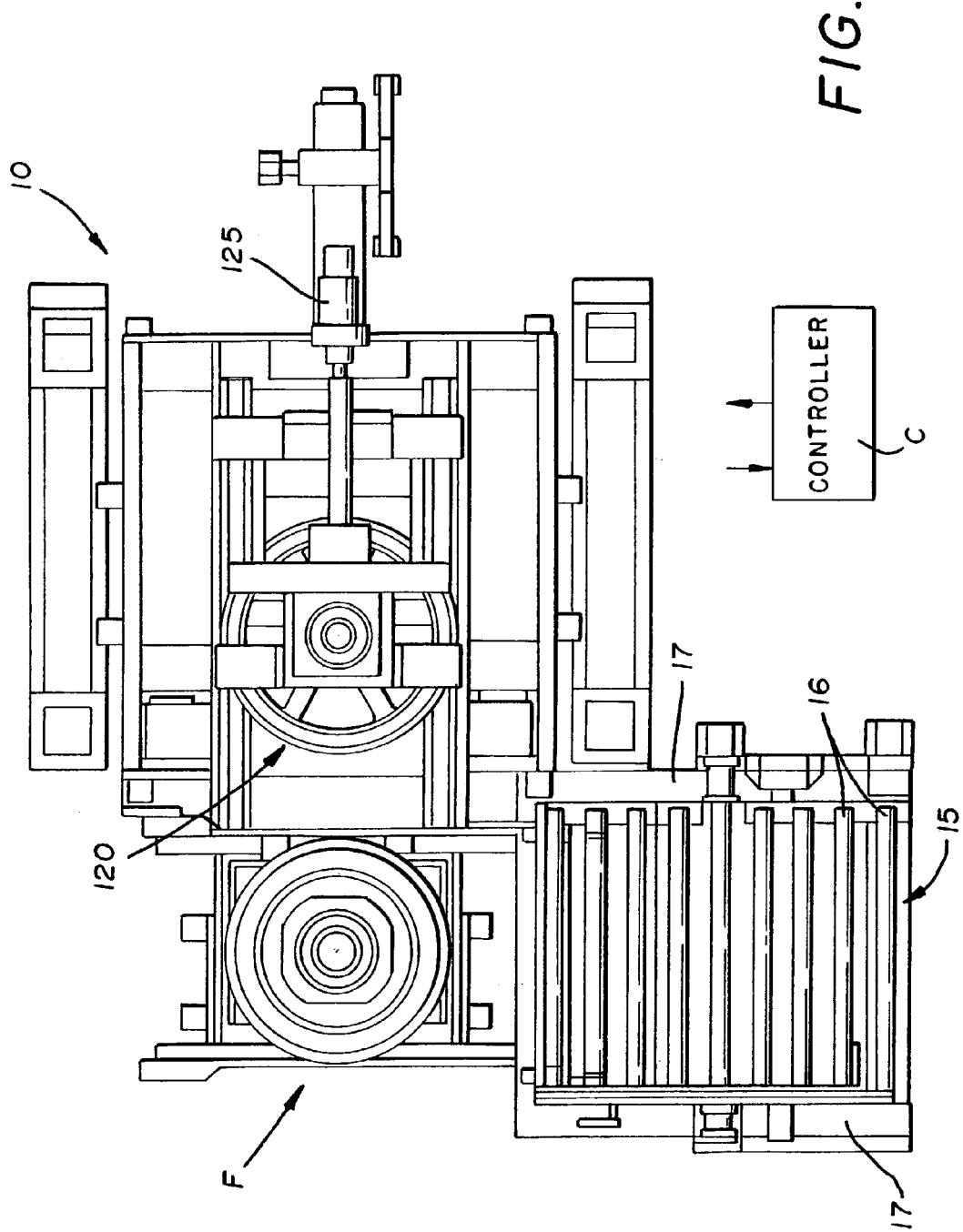
FIG. 1 is a top plan view of a tire uniformity machine according to the concepts of the present invention.

As best shown in FIG. 1, tire T may be delivered into the framework F of the machine 10, and removed therefrom after testing, as by a conveyer, generally referred to by the numeral 15. Conveyer 15 may include a plurality of rollers 16 rotatably supported between parallel side members 17 forming a roller bed. The side members 17 of conveyer 15 and side members 11 of machine 10 are generally spaced to an extent such that they are capable of receiving tires of significantly varying diameter. Once the tire T is brought within the framework F of the machine 10, the tire T is chucked and prepared for testing.

In that regard, the upper frame members 12 carry a chuck assembly, which may be divided into upper and lower assemblies, the orientation of which is flexible, for example, a first chuck assembly, generally referred to by the numeral 20, and second chuck assembly 90 shown in FIG. 2, may form the overall chuck assembly. First chuck assembly generally includes a chuck 21 and a spindle 22. The spindle 22 may be made hollow defining a passage for transporting air to and from the tire T to maintain proper inflation thereof. To that end, a union 26 may be rotatably coupled to one end of spindle 22 such that the spindle 22 may rotate within union 26 facilitating delivery of air to the tire T, from an air supply 28 (FIGS. 1 and 2), during rotation of the upper chuck assembly 20.

The chuck assembly 20 may be driven by a motor assembly, generally indicated by the numeral 30, or, as shown, motor assembly 30 may drive the load wheel as described more completely below. Motor assembly 30 is supported on framework F and may be secured by bolts (not shown). A housing, generally referred to by the numeral 40, surrounds motor 31 to protect the motor 31 from any debris.

A second chuck assembly 90, (FIG. 2) is shown mounted on upper frame member 12 and is at least partially supported on a shaft 91 which is attached to an actuator assembly 92. Actuator assembly 92 is operable to raise and lower the chuck assembly 90. In other words, the actuator assembly 92 may axially move the second chuck assembly 90 toward or away from the first chuck assembly 30. In this way, the tire T can be chucked between the first and second chuck assemblies 20, 90 for testing purposes.

Second chuck assembly 90 is freely rotatable, and rotates under torque generated by the load wheel assembly 120, described below, acting through the chucked tire T.

When a tire is received within the machine 10, the second chuck assembly 90 may be moved axially to chuck the tire T between the first and second chuck assemblies 20, 90 in preparation for testing. It will be appreciated that when the second chuck assembly 90 is in its retracted position, the tire T may be moved into registry with the second chuck 90 along conveyor 15. At this point, the second chuck assembly 90 is urged axially toward the tire T so that the tire T engages the first chuck assembly 20 to firmly seat the tire T. The tire T is then inflated to the desired inflation pressure by air directed from supply 28 through union 26. Once inflated, the tire T is rotated and a load wheel, described below, is moved into engagement with the tire T to perform testing thereon.

A load wheel assembly, generally indicated by the numeral 120, is also provided and is carried by a carriage, generally referred to by the numeral 121, which may be mounted on the frame F. The load wheel assembly 120 includes a load wheel 122 rotatably mounted on a spindle 123 located on carriage 121. The spindle 123 has associated with it one or more load cells which are used to measure certain characteristics of the tire T, as will be explained. The carriage 121 is movable toward and away from the tire T under the power of a load wheel motor assembly, generally indicated by the numeral 125.

During operation, tire T is brought into the tire uniformity machine 10 along conveyor 15. Once the tire T is in registry with the chuck assembly 20,90, the tire T is chucked and the load wheel, 122 is brought in to contact with the tire T. Motor assembly 30 drives spindle 123 to rotate load wheel 122, such that, when load wheel 122 is in contact with the tire T, the load wheel 122 causes the tire to rotate on chuck assembly 20. Load cells associated with the load wheel 122 measure forces transmitted from the tire T to the load wheel 122 and relay this information to a controller C. These forces, along with other measurements made by the tire uniformity machine 10, allow controller C to assess the characteristics of the tire T and make corrections, as necessary.

Figure 3:
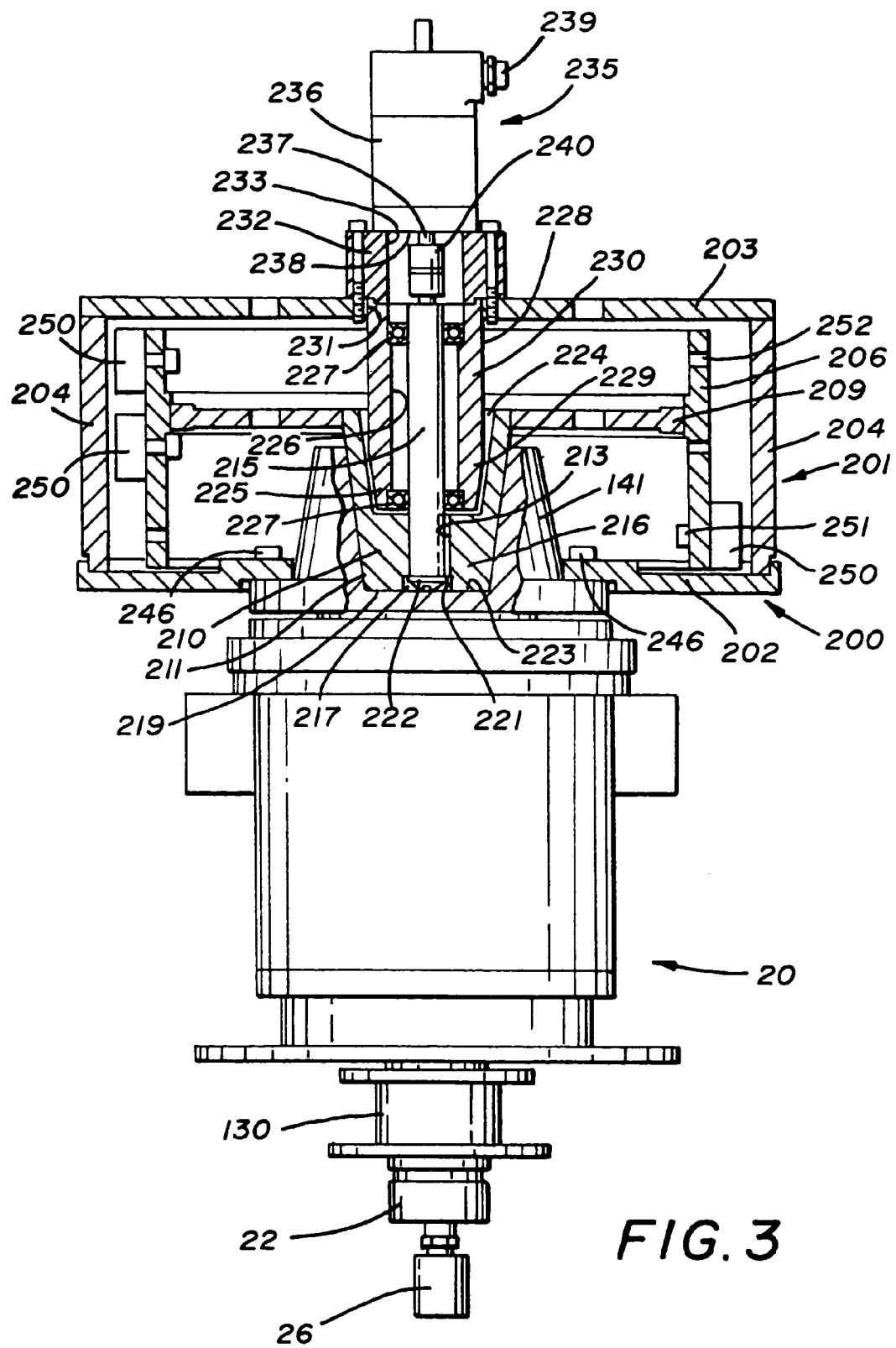
FIG. 3 is a partially sectional side elevational view depicting a dynamic calibrator according to the present invention mounted on a spindle in a tire uniformity machine similar to that depicted in FIG. 1.
Figure 4:
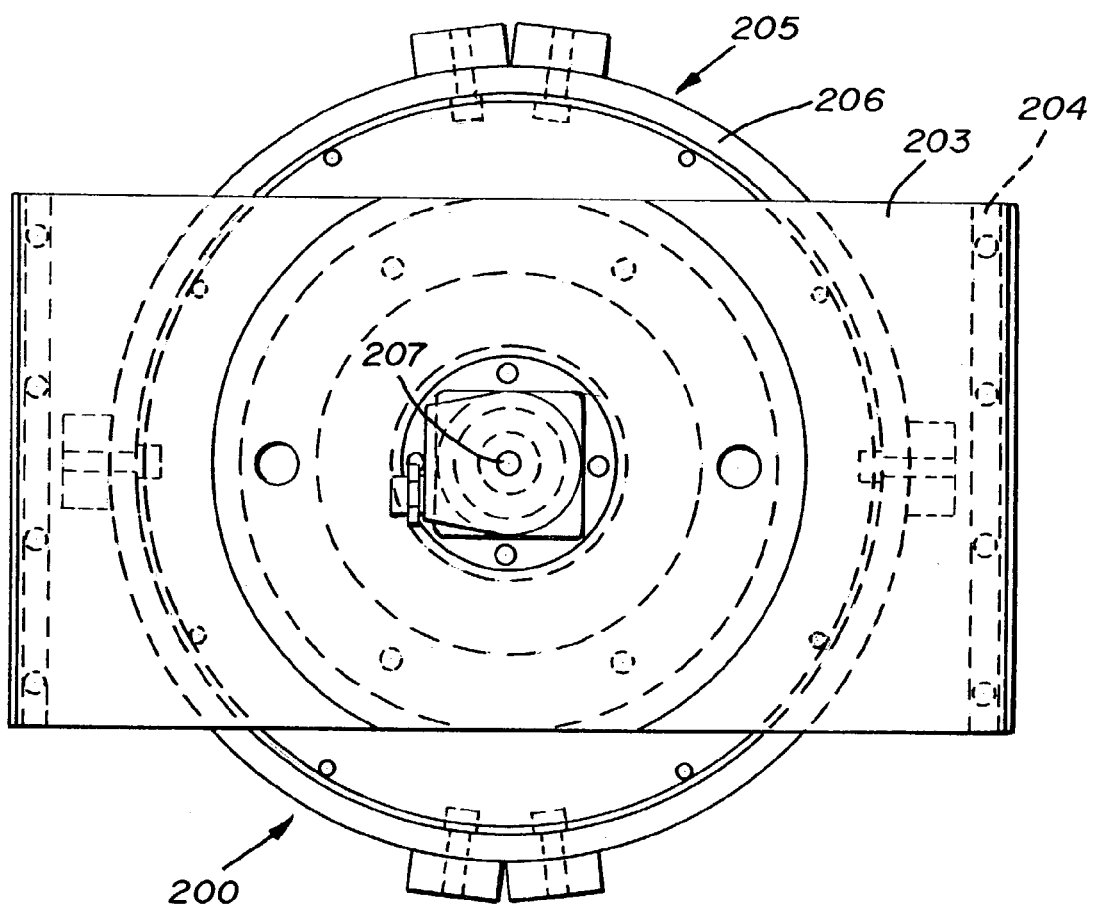
FIG. 4 is a bottom elevational view of a dynamic calibrator according to the present invention depicted with weights attached to its circumference.

In some tire uniformity machines, as shown in FIG. 3, a load cell 130 may be associated with the chuck assembly 20, 90. In this configuration, the load cell 130 associated with the chuck assembly 20, 90 may measure the characteristics of the tire T.

Since accurate testing depends on the ability of load cell 130 to provide accurate and consistent readings of the forces at the tire T, calibration of the load cell 130 may be necessary from time to time. A dynamic calibrator, generally referred to by the numeral 200 in the accompanying FIGURES, is provided to perform calibration of the load cell 130. The calibrator 200 may be mounted on the chuck assembly 20 facilitating its use in the field, as well as, during assembly and installation of the tire uniformity machine 10. Such attachment, also, eliminates the need to disassemble the chuck assembly 20.

Dynamic calibrator 200 is generally provided with a framework, generally referred to by the numeral 201, having a top frame member 202, a bottom frame member 203 and side frame members 204 which may define a generally box-like structure. It should be noted that references to top or bottom are made to aid the reader in understanding the description, but are not limited as to the particular orientation of elements. A calibration wheel, generally referred to by the numeral 205, is located within the framework 201 and made rotatable therein.

Calibration wheel 205 has a rim 206 radially spaced from the center 207 of the wheel 205 by a spoke-like web 209 extending from a central hub 210. Hub 210 may be adapted to be received by chuck assembly 20, and, thus, is provided with an exterior surface 211 suitable for mating with chuck assembly 20. In the embodiment shown, surface 211 has a frusto-conical shape, which generally conforms to the cavity defined by the cap assembly 141 of chuck assembly 20. The frusto-conical surface 211 defines a bore 213 for receiving a portion of a shaft 215, which is rotationally coupled to hub 210, as by a key 216. Hub 210 may further define a first recess 217 extending below a plane defined by the end face 219 of hub 210. As shown, the wall 221 of recess 217 may be generally circular. A washer 222 sized to fit within the confines of wall 221 may be placed adjacent to the floor 223 of recess 217 and axially held by a fastener, which attaches to shaft 215.

The hub 210 may further be provided with a second recess 224 formed axially adjacent the bore 213 and sized to receive a bearing support assembly, generally referred by the numeral 225. The inner surfaces of second recess 224 may be dimensioned to provide adequate clearance between the hub 210 and bearing support assembly 225 to allow free rotation of the hub 210.

Bearing support assembly 225 defines a central bore 226 for receiving shaft 215 and suitable antifriction bearings 227, which interrelate with the shaft 215 and allow free rotation thereof. The bearing support assembly 225 has a generally annular wall 228, which may be sloped or otherwise contoured at the bottom portion 229 of wall 228 to properly align with the interior surfaces of the hub 210. The lower portion 230 of wall 228 generally extends axially away from the hub 210 toward the bottom frame member 203. An aperture 231 formed in bottom frame member 203 effects an extension of central bore 226 through the bottom frame member 203 allowing the shaft 215 to extend externally of the framework 201. A spacer 232 may be fastened to bottom member 203 and define a spacer bore 233 that lies adjacent to and corresponds with the central bore 226. As necessary, a seal may be provided between these bores 226, 233.

A motor assembly, generally indicated by the numeral 235, may be placed adjacent spacer 233. The motor assembly 235 generally includes a motor 236 having a motor shaft 237 that extends from at least one end 238 of the motor 236. As shown in FIG. 3, the motor 236 is mounted to the spacer 232 with the motor shaft 237 entering spacer bore 233 where it can be coupled to the shaft 215.

A coupling assembly 240 may be provided to couple motor shaft 237 to shaft 214, and may include a clamp joined by fasteners, as is common in the art. Once the shafts 215, 237 are coupled, the motor assembly 235 may be used to rotate the hub 210 at a known velocity. A stepper motor may be used to rotate hub 210 and provide accurate control of the wheel's velocity measurement. The motor assembly 235 may be provided with a pickup 239 for sending and receiving velocity control information to controller C.

For calibration purposes, the dynamic calibrator 200 is fastened to the chuck assembly 140 as by fasteners 246 attaching the frame 201 to the chuck assembly 140. The wheel 205 may be rotated at the known velocity and readings from the load cell 130 recorded. To generate a profile, i.e., a record of a number of readings from the load cell 130, the wheel 205 may be rotated at a number of velocities. Alternatively, for a single velocity, a weight 250 having a known mass, or plurality of weights, are fastened to the wheel as by bolts 251 extending through holes 252 defined within the rim. With the weights 250 attached, the calibration wheel 205 is rotated at a velocity and the output values of the load cells are recorded. By changing the weights 250 and/or changing the wheel velocity, a first test profile is generated by the measurements from the load cell 130 and recorded by the controller C. Consequently, when it becomes necessary to recalibrate the load cells 130, such as after moving or any other circumstances making calibration desirable, the load cell's performance may be compared to the first test profile by performing the same procedure to generate a second test profile. If the first and second test profiles do not fall within a tolerable range of each other, adjustments may be made to the load cell 130 to align the first and second test profiles. As will be appreciated, this may require performing the calibration procedure a number of times.

While a full and complete description of the invention has been set forth in accordance with the dictates of the patent statutes, it should be understood that modifications can be resorted to without departing from the spirit hereof or the scope of the appended claims.

What is claimed is:

1. A dynamic calibrator in a tire uniformity machine for testing a tire having a chuck assembly for receiving and chucking a tire and a load cell in sensing relation therewith, the load cell transmitting sensed information to a controller, the dynamic calibrator comprising a rotatable calibration wheel coupled to the chuck assembly; a motor assembly operatively coupled to the wheel to cause rotation thereof; and a wheel velocity sensing assembly.

2. The dynamic calibrator of claim 1, further comprising a weight attached to said wheel.

3. The dynamic calibrator of claim 1, further comprising a plurality of receivers on said wheel, and a weight releasably attached to one of said receivers.

4. The dynamic calibrator of claim 3, wherein said receivers are axially aligned.

5. The dynamic calibrator of claim 4, wherein said receivers are radially spaced along said wheel.

6. The dynamic calibrator of claim 1 further comprising a framework attachable to said chuck assembly, wherein said wheel is rotatably supported by said framework.

7. The dynamic calibrator of claim 6, wherein said framework includes a collar axially aligned with said wheel; said motor assembly attaching to said framework at said collar.

8. The dynamic calibrator of claim 1, wherein said motor assembly includes a stepper motor.

9. The dynamic calibrator of claim 8, wherein said wheel velocity sensing assembly is within said stepper motor.

10. A dynamic calibrator in a tire uniformity machine for testing a tire having a chuck assembly for receiving and chucking a tire, a load cell in sensing relation with the chuck assembly, the load cell transmitting sensed information to a controller, the dynamic calibrator comprising:
  a) a framework attachable to the chuck assembly;
  b) a wheel rotatably supported by said framework;
  c) a weight releasably attached to a point on said wheel;
  d) a motor assembly operative with said wheel to cause rotation thereof; and
  e) a velocity sensor measuring a velocity of said calibration wheel, said velocity sensor being in communication with the controller, whereby said wheel is rotated by said motor assembly at a velocity with said weight attached to generate a force measured by said load cell.

* * * * *